(12) United States Patent
Sidorovich Paradiso et al.

(10) Patent No.: US 11,156,093 B2
(45) Date of Patent: Oct. 26, 2021

(54) FAN BLADE ICE PROTECTION USING HOT AIR

(71) Applicant: PRATT & WHITNEY CANADA CORP., Longueuil (CA)

(72) Inventors: Ivan Sidorovich Paradiso, Toronto (CA); Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 77 days.

(21) Appl. No.: 16/797,066

(22) Filed: Feb. 21, 2020

(65) Prior Publication Data
US 2020/0332658 A1 Oct. 22, 2020

Related U.S. Application Data

(60) Provisional application No. 62/835,618, filed on Apr. 18, 2019.

(51) Int. Cl.
*F01D 25/02* (2006.01)
*F01D 5/08* (2006.01)

(52) U.S. Cl.
CPC .......... *F01D 5/08* (2013.01); *F05D 2220/323* (2013.01)

(58) Field of Classification Search
CPC . F01D 25/02; F01D 5/08; F02C 7/047; B64D 15/00; B64D 15/02; B64D 15/04; B64D 15/20
See application file for complete search history.

(56) References Cited

U.S. PATENT DOCUMENTS

| 2,630,965 | A | * | 3/1953 | Greatrex | F02C 7/047 |
| | | | | | 415/115 |
| 5,197,855 | A | | 3/1993 | Magliozzi et al. | |
| 6,125,626 | A | | 10/2000 | El-Aini et al. | |
| 9,387,923 | B2 | | 7/2016 | Stretton et al. | |
| 9,828,914 | B2 | | 11/2017 | Suciu et al. | |
| 10,113,444 | B2 | | 10/2018 | Huang et al. | |
| 10,323,571 | B2 | | 6/2019 | Subramanian et al. | |
| 10,711,797 | B2 | | 7/2020 | Kroger et al. | |
| 10,724,435 | B2 | | 7/2020 | Kroger et al. | |
| 10,738,650 | B2 | | 8/2020 | Scholtes et al. | |

(Continued)

FOREIGN PATENT DOCUMENTS

GB 2038425 7/1980

*Primary Examiner* — Woody A Lee, Jr.
*Assistant Examiner* — Maxime M Adjagbe
(74) *Attorney, Agent, or Firm* — Norton Rose Fulbright Canada LLP

(57) ABSTRACT

A fan assembly for a gas turbine engine is described which includes a fan and a leading edge assembly mounted to the fan. The leading edge assembly includes a plurality of leading edge extensions projecting from a central core and circumferentially spaced apart to align with leading edges of the fan blades. The leading edge extensions define cavities between the leading edges and the extensions. The cavities extend radially at least partially within the leading edge extensions, and receive heated pressurized air from the engine in operation. Elongated slots extend radially along a downstream edge of the leading edge extensions, and are defined axially between the downstream edge and the leading edges of the blades. The slots provide fluid flow communication between the cavities and at least pressure surfaces of the fan blades.

20 Claims, 11 Drawing Sheets

(56) References Cited

U.S. PATENT DOCUMENTS

| | | |
|---|---|---|
| 2015/0345327 A1 | 12/2015 | Huang et al. |
| 2016/0312799 A1 | 10/2016 | Yu |
| 2018/0066536 A1* | 3/2018 | Scholtes ................. F02C 7/047 |
| 2018/0087456 A1 | 3/2018 | Alecu et al. |
| 2019/0024533 A1 | 1/2019 | Scholtes et al. |

* cited by examiner

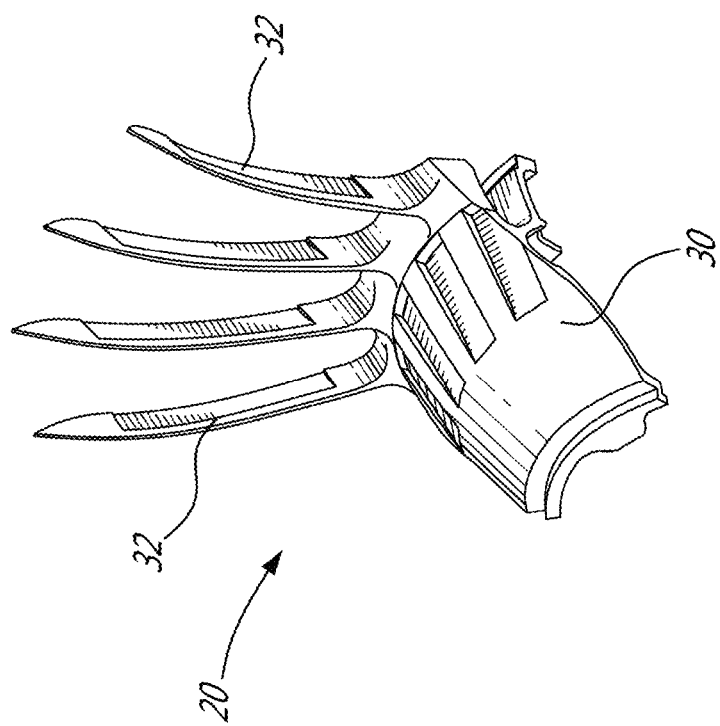

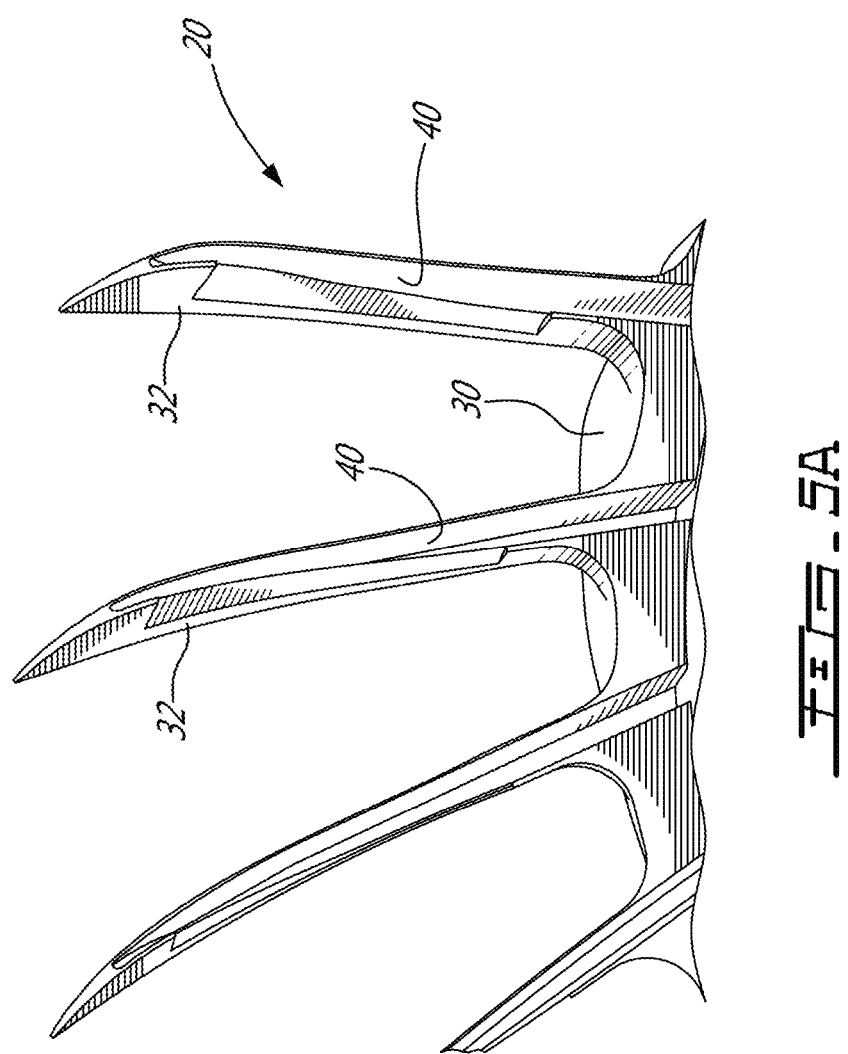

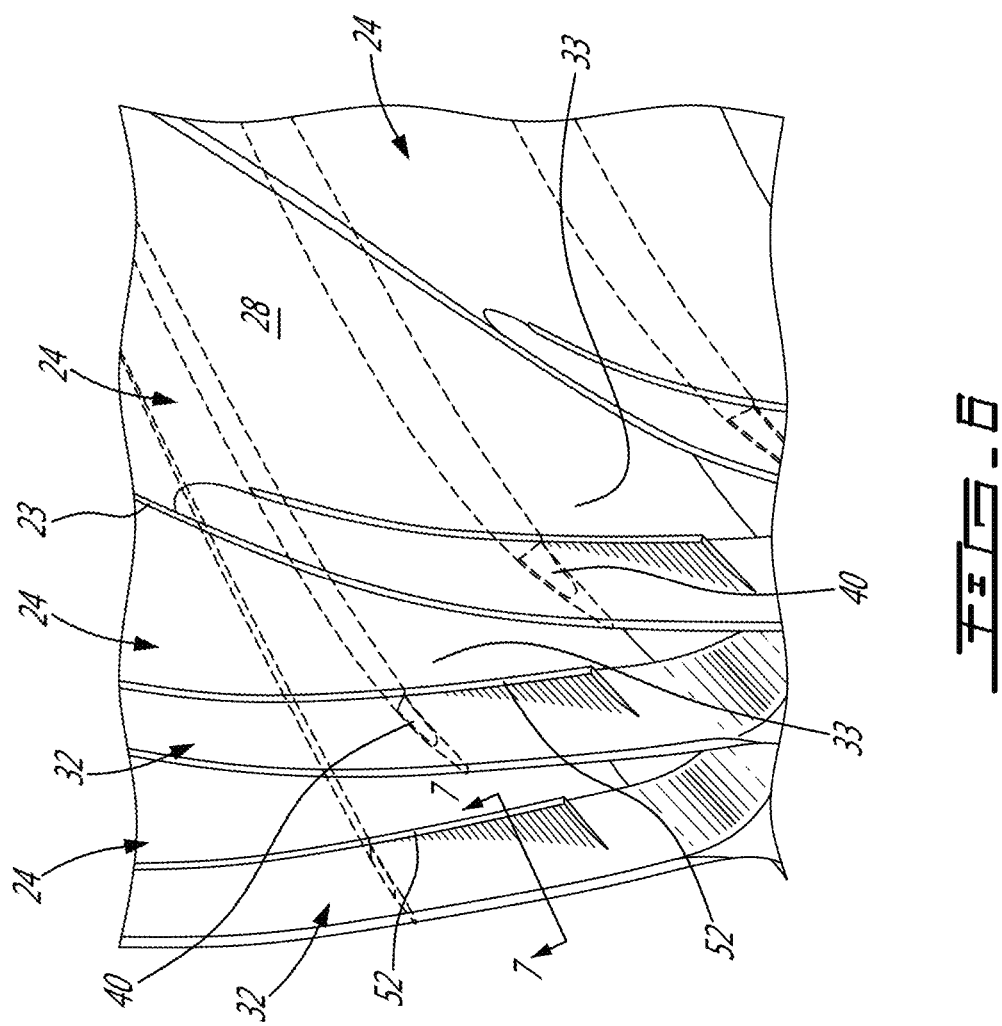

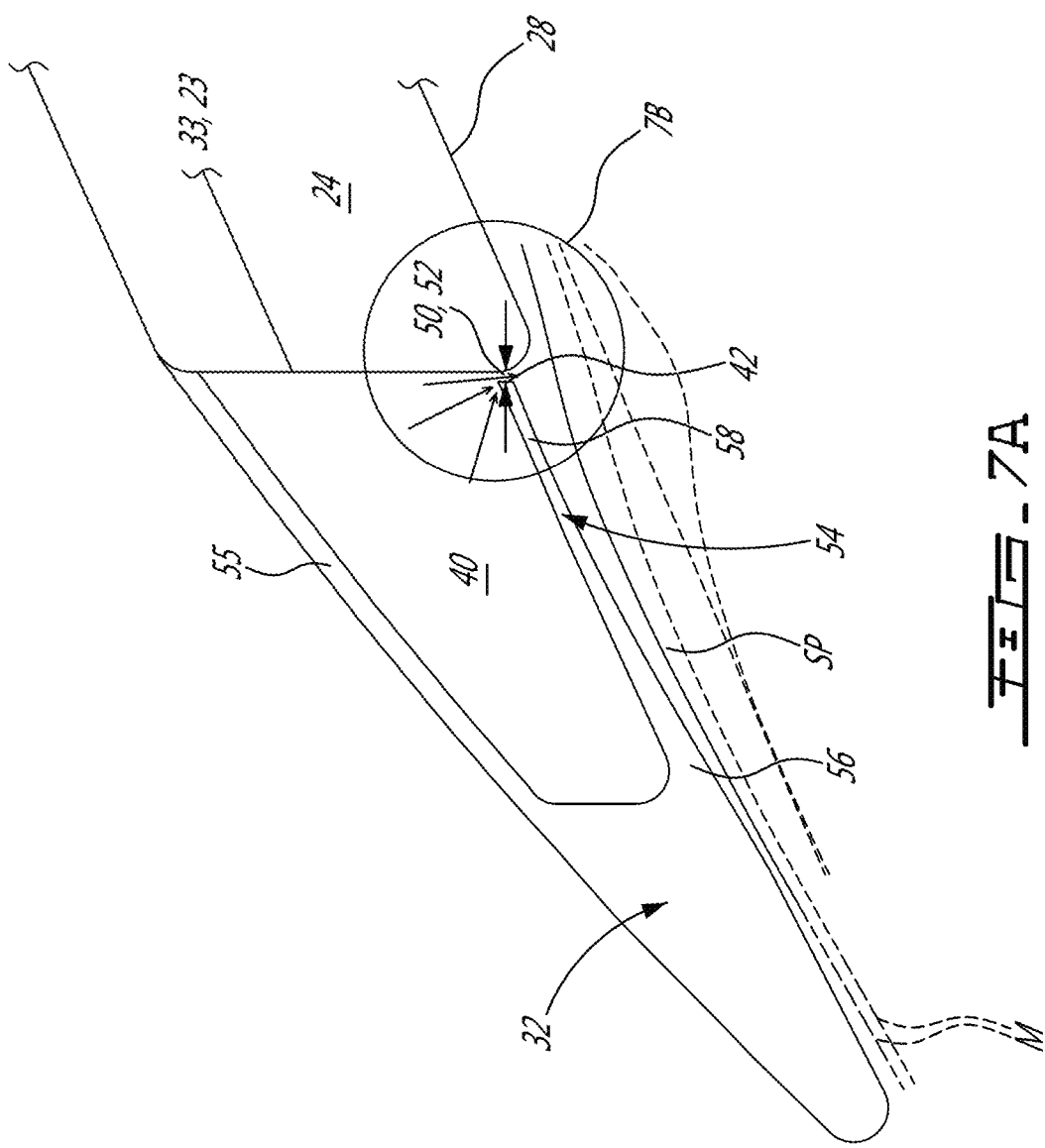

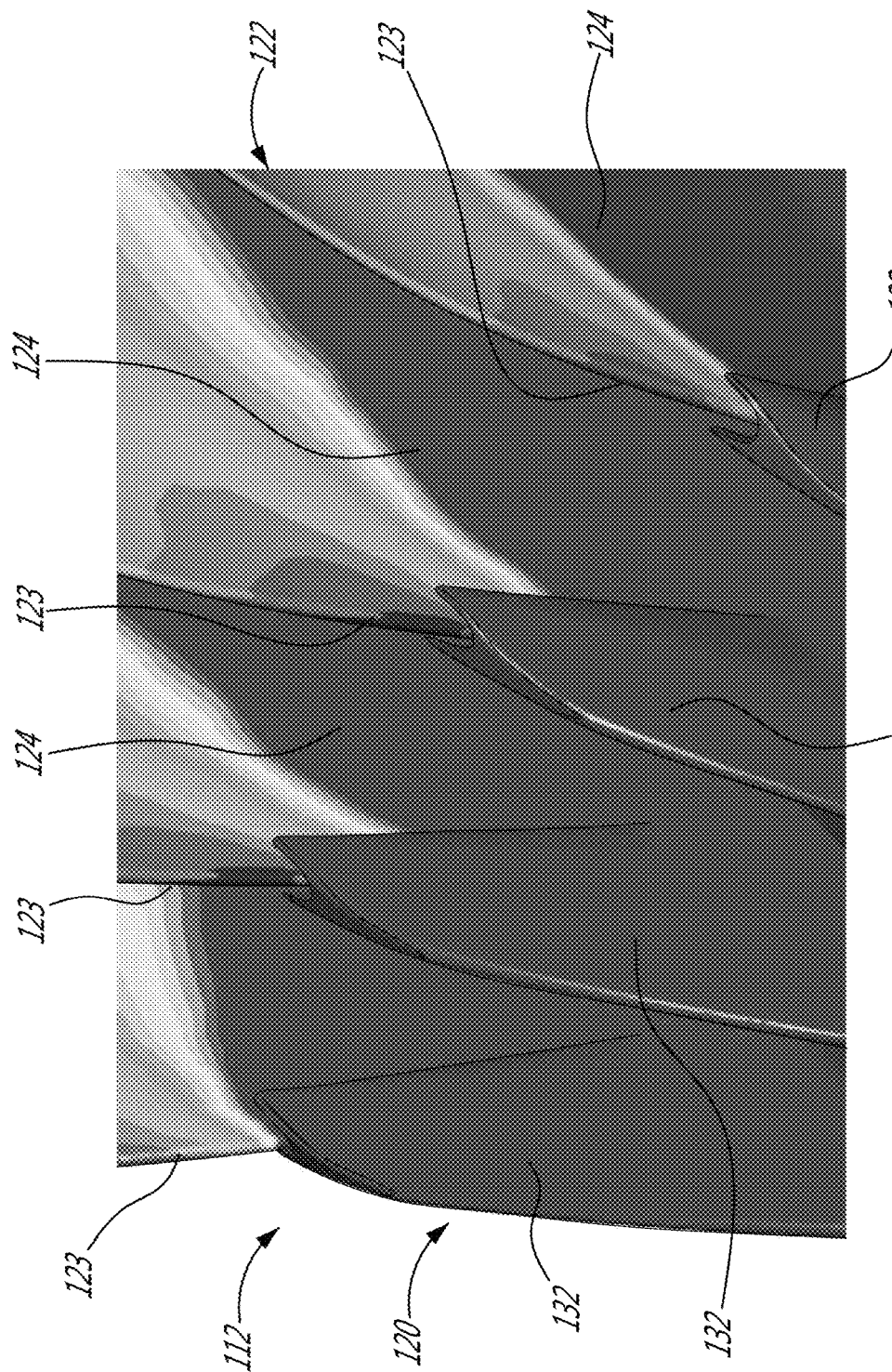

FAN BLADE ICE PROTECTION USING HOT AIR

CROSS-REFERENCE

The present application claims priority on U.S. Patent Application No. 62/835,618 filed Apr. 18, 2019, the entire contents of which are incorporated herein by reference.

TECHNICAL FIELD

The present disclosure relates generally to anti-icing in aircraft engines and, more particularly, to protecting the fan of a turbofan engine from ice build-up.

BACKGROUND

Ice build-up on the fan blades of a turbofan gas turbine engine can occur under various operating conditions, including cold operating temperatures and/or when air flow containing moisture or precipitation encounters the fan under appropriate conditions. Ice can form when the air pressure, humidity, and/or air flow temperature to which the fan blades are exposed are within specific ranges. Ice formation on the fan blades is undesirable, as it can accumulate in layers and then become dislodged by air flow and motion, causing hard ice particles to be ingested into the engine.

Existing systems employed to limit or prevent ice buildup on fan blades use discrete holes, defined in the fan blade airfoil surfaces, to distribute warm air across the fan blades. However, the presence of such hot air holes in the fan blade, particularly when they are located near the radially inner roots of the airfoils, may cause localized stresses and/or may weaken the fan blades due to the reduced fan blade thickness caused by the presence of the hot air holes.

SUMMARY

There is accordingly provided a fan assembly for a gas turbine engine having a longitudinal center axis and defining a primary airflow path therethrough, the fan assembly comprising: a fan rotatable about the longitudinal center axis, the fan having a central hub and a plurality of fan blades projecting from the central hub, the fan blades having blade leading edges and extending a full span length from a radially inner root to a radially outer tip; and a leading edge assembly mounted to the fan for rotation therewith, the leading edge assembly having a central core attached to the central hub of the fan and a plurality of leading edge extensions projecting from the central core and circumferentially spaced apart to align with the blade leading edges of the fan blades, the leading edge extensions extending radially away from the central core a distance less than the full span length of the fan blades, the leading edge extensions mounted to the fan blades to define internal cavities between the blade leading edges of the fan blades and the leading edge extensions, the internal cavities extending radially away from central core at least partially within the leading edge extensions, the internal cavities receiving heated pressurized air from the gas turbine engine in operation, and slots that are elongated and extending radially along a downstream edge of the leading edge extensions, the slots defined axially between the downstream edge and the blade leading edges of the fan blades to provide fluid flow communication between the internal cavities and at least pressure surfaces of the fan blades.

There is also provided a gas turbine engine comprising a fan mounted on a shaft for rotation about a longitudinal center axis, the fan including a hub supporting a plurality of fan blades, and a leading edge blade assembly mounted to the fan for rotation therewith about the longitudinal center axis, the leading edge assembly having a central core attached to the hub of the fan and a plurality of leading edge extensions radially projecting from the central core and circumferentially spaced apart to align with the fan blades, the leading edge extensions mounted to and extending upstream from blade leading edges of the fan blades, air cavities defined between the blade leading edges of the fan blades and the leading edge extensions, the air cavities extending radially away from the longitudinal center axis near the central core and at least partially enclosed by the leading edge extensions, the air cavities receiving heated pressurized air from an engine cavity of the gas turbine engine during operation, and gaps defined axially between downstream edges of the leading edge extensions and the leading edges of the fan blades on at least a pressure side of the fan to provide fluid flow communication between the internal air cavities and a pressure side of the fan blades.

There is further provided a method of impeding icing on a fan blades of a fan in a gas turbine engine, the method comprising: receiving heated pressurized air within cavities defined between leading edges of the fan blades and leading edge extensions of a leading edge assembly mounted to the fan for rotation therewith, the leading edge extensions being disposed upstream of the leading edges of the fan blades; allowing the heated pressurized air to exit the cavity through slots located at least on a pressure side of the fan, the slots extending radially within an inner span half of the fan blades and the slots defined axially between downstream edges of the leading edge extensions and the blade leading edges of the fan blades downstream therefrom; and directing the heated pressurized air exiting via the slots radially outwardly to form a film of the heated pressurized air flowing in a downstream direction over at least the pressure surfaces of the fan blades.

Further details of these and other aspects of the subject matter of this application will be apparent from the detailed description included below and the drawings.

BRIEF DESCRIPTION OF THE DRAWINGS

Reference is now made to the accompanying drawings, in which:

FIG. 4 is a partially-sectioned perspective view of the leading edge assembly of the fan assembly of FIG. 2, shown in isolation without the fan blades of FIG. 3.

FIGS. 5A and 5B are partial rear views of the leading edge assembly of FIG. 4.

FIG. 6 is a partial perspective view of the fan assembly of FIG. 2.

FIG. 7A is a partial transverse cross-sectional view of the fan assembly of FIGS. 2 and 6, taken through line 7-7 in FIG. 6.

FIG. 7B is a detailed view taken from region 7B in FIG. 7A.

FIG. 8 is a partial perspective view of another fan assembly of the turbofan gas turbine engine of FIG. 1, shown in an assembled state, the fan having a plurality of fan blades and an alternate leading edge assembly secured to the fan.

Further details of the invention and its advantages will be apparent from the detailed description included below.

DETAILED DESCRIPTION

Figure 1:
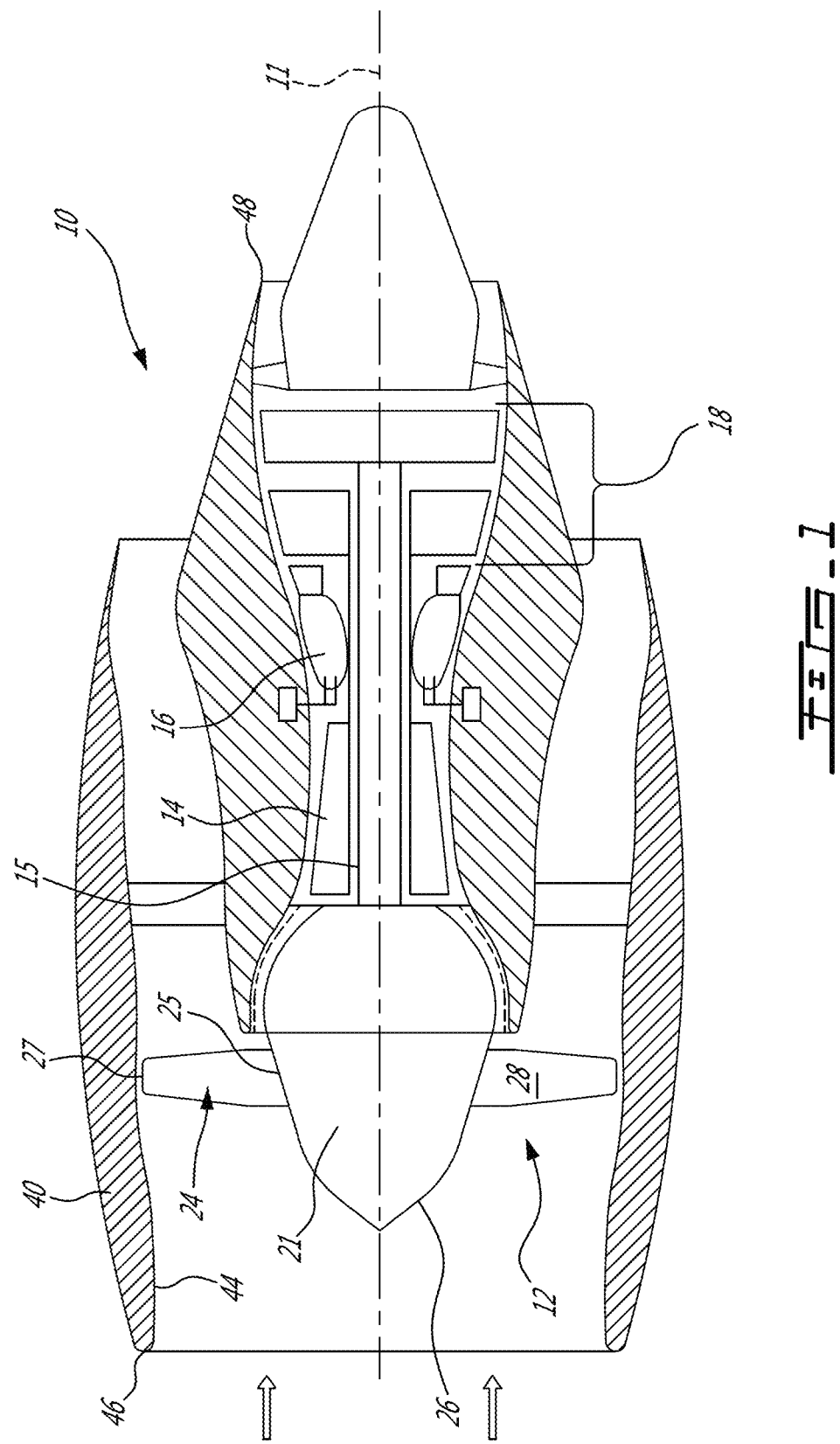
FIG. 1 is a schematic axial cross-section view of a turbofan gas turbine engine having a fan assembly, with air flowing through the engine from left to right as shown.

FIG. 1 illustrates a gas turbine engine 10 of a type preferably provided for use in subsonic flight, generally comprising in serial flow communication a fan assembly 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Air received into a forward end of the engine 10 relative to a primary airflow path passes first axially through the fan blades 24 of the fan 12. Downstream of the fan assembly 12, the air is split into an outer annular flow through the bypass duct 13 and an inner/core flow through the core of the engine. A longitudinal engine axis 11 extends through the center of the gas turbine engine 10. The terms "axial" and "radial" as used herein are understood to be with reference to this longitudinal engine axis 11 of the gas turbine engine 10.

As will be seen, the gas turbine engine 10 comprises an anti-icing system providing hot air to the fan blades 24 of the fan assembly 12 in order to provide ice protection to the fan blades 24.

Pressurized heated air for anti-icing purposes as described herein may originate from compressor 14 of the engine 10 for example or from any other suitable source. In some embodiments, such pressurized heated air may be routed from compressor 14 to the interior of a fan nose cone or fan hub, via one or more bearing housing chambers to provide cooling to such bearings before getting to the fan nose cone. In some embodiments, such pressurized heated air may be routed from compressor 14 to the interior of fan nose cone or fan hub, a hollow center of the low pressure shaft 15 of the engine 10, to which fan 12 may be drivingly coupled.

Figure 2:
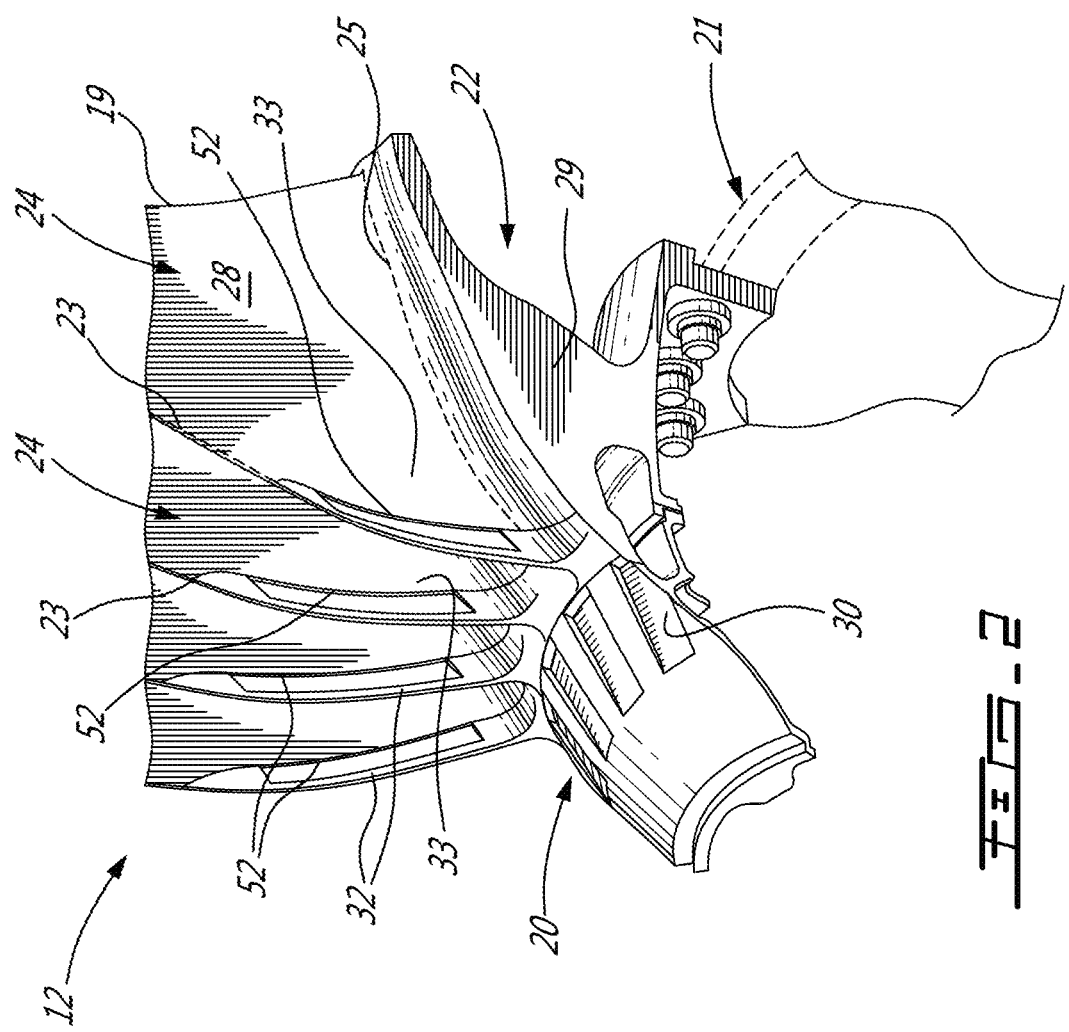
FIG. 2 is a partially-sectioned perspective view of the fan assembly of the turbofan gas turbine engine of FIG. 1, shown in an assembled state, the fan having a plurality of fan blades and a leading edge assembly secured to the fan blades.

Referring now to FIG. 2, the fan assembly 12 of the gas turbine engine 10 includes generally a fan 22 and a leading edge assembly 20 mounted thereto, as will be described. The fan 22 includes a plurality of fan blades 24 which are circumferentially arranged and mounted to a central annular disk or central hub 21 that is fixed to a low pressure (LP) main engine shaft 15 of the engine 10 (see FIG. 1). Each of the fan blades 24 of the fan 22 may be individually formed and mounted to the hub 21, or alternately a number of fan blade segments (such as that shown in FIG. 2) may be circumferentially arranged together to form the annular blade array of the fan 12, each of these segments comprising several fan blades 24 (four fan blades 24 are formed in the segment in FIG. 2). Alternately still, the fan blades 24 may be formed as an integrally bladed rotor (IBR).

The fan assembly 12 also includes a leading edge assembly 20, that is mounted to the fan 22, and more particularly to the array of fan blades 24. The leading edge assembly 20 may be engaged with, or form part of, a nose cone 26 of the fan 22 (see FIG. 1)—which is sometimes referred to as a "spinner". The leading edge assembly 20 may according form all or part of the spinner of the fan assembly 12. In at least the depicted embodiment, the leading edge assembly 20 is fixed, but detachably mounted, to the fan 22, together forming the fan assembly 12. Thus, if needed for assembly, service or repair, for example, the leading edge assembly 20 may be detached from the fan 22 of the fan assembly 12, and replaced as required.

The fan assembly 12 as described herein is configured to allow a stable and warm boundary layer to be formed on the airfoil surfaces of the fan blades 24, at least near the blade roots, in order to keep the airfoil surfaces of the fan blades 24 within these regions (e.g. near the blade roots) above the freezing point of water, thereby preventing, or at least limiting, the buildup of ice on the fan blade 24.

More particularly, as seen in FIG. 1, the fan 22, which is rotatable about the longitudinal center axis 11 of the engine 10, includes a central hub 21 and a plurality of fan blades 24 which protect away from the central hub, in a generally radial direction. Each of the fan blades 24 is formed by an airfoil which extends in a span-wise directly a full span length from a radially inner root 25 to a radially outer tip 27, and includes a leading edge 23. For simplicity, the airfoils will simply be referred to herein as "fan blades" herein.

Referring now to FIGS. 2 to 6, the fan assembly 12 also includes the leading edge assembly 20, that is mounted to the fan 22 for rotation therewith, and more particularly to the array of fan blades 24 thereof.

The leading edge assembly 20 includes generally a central core 30 and a plurality of leading edge extensions 32 projecting form the central core 30 and circumferentially spaced apart about its perimeter such as to align with the fan blades 24 of the fan 22. The central core 30 may be attached to the central hub 21 of the fan, either directly or indirectly via the inner blade platforms 29 of the fan blades 24 as seen in FIG. 2. As can be seen in FIG. 2, the leading edge extensions 30 extend substantially radially away from the central core 30 (but follow the curvature of the fan blades 24) a radial or span-wise distance that is less than the full span length (i.e. between the roots 25 and tips 27) of the fan blades 24.

The leading edge extensions 32 of the leading edge assembly 20 are mounted to the fan blades 24, and more particularly to a radially inner portion 33 of their leading edges 23, such as to define internal cavities 40 therein.

Figure 3:
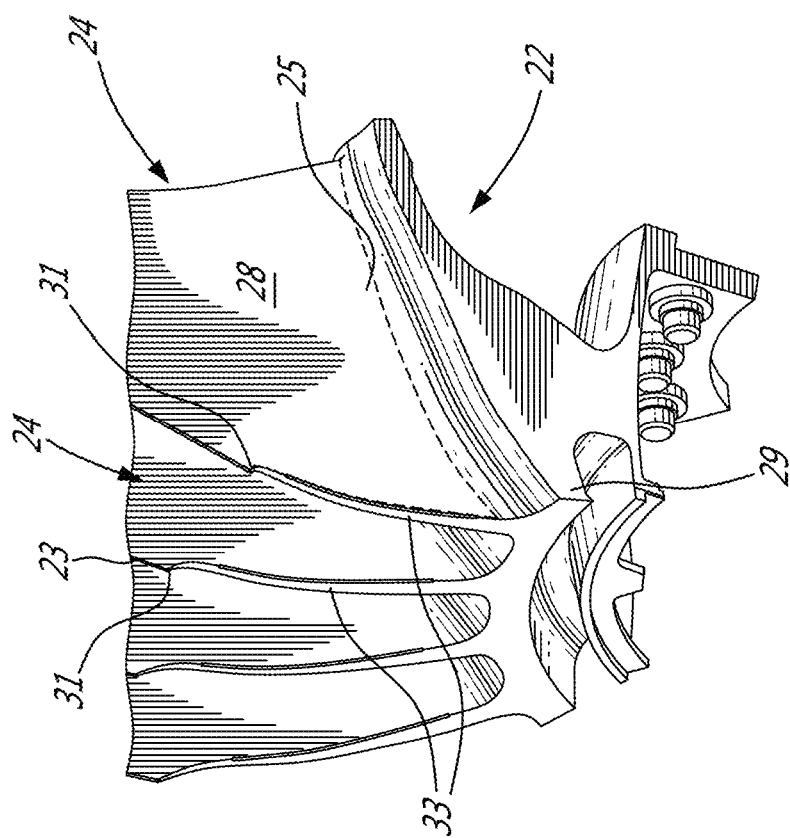
FIG. 3 is a partially-sectioned perspective view of the fan blades of the fan assembly of FIG. 2, shown in isolation without the leading edge assembly of the present disclosure secured thereto.

The radially inner portions 33 of the leading edges 23 of the fan blades 24 are formed to be at least somewhat blunt, as can be seen in FIG. 3. This blunt region may extend radially outward along the leading edges of the blades, from the inner blade platforms 29 of the fan blades 24 to a location 31 where the leading edges 23 return to a more normal, sharper, blade profile. The span-wise position of the location 31 is selected such that the blunt region of the radially inner portions 33 of the leading edges allows for a warm air ejecting slots 52, as will be described, over a predetermined inner-span portion of the fan blades. This inner-span portion, and thus the span-wise position of location 31, is however between 0% and 50% total span of the blades 24.

Figure 5B:
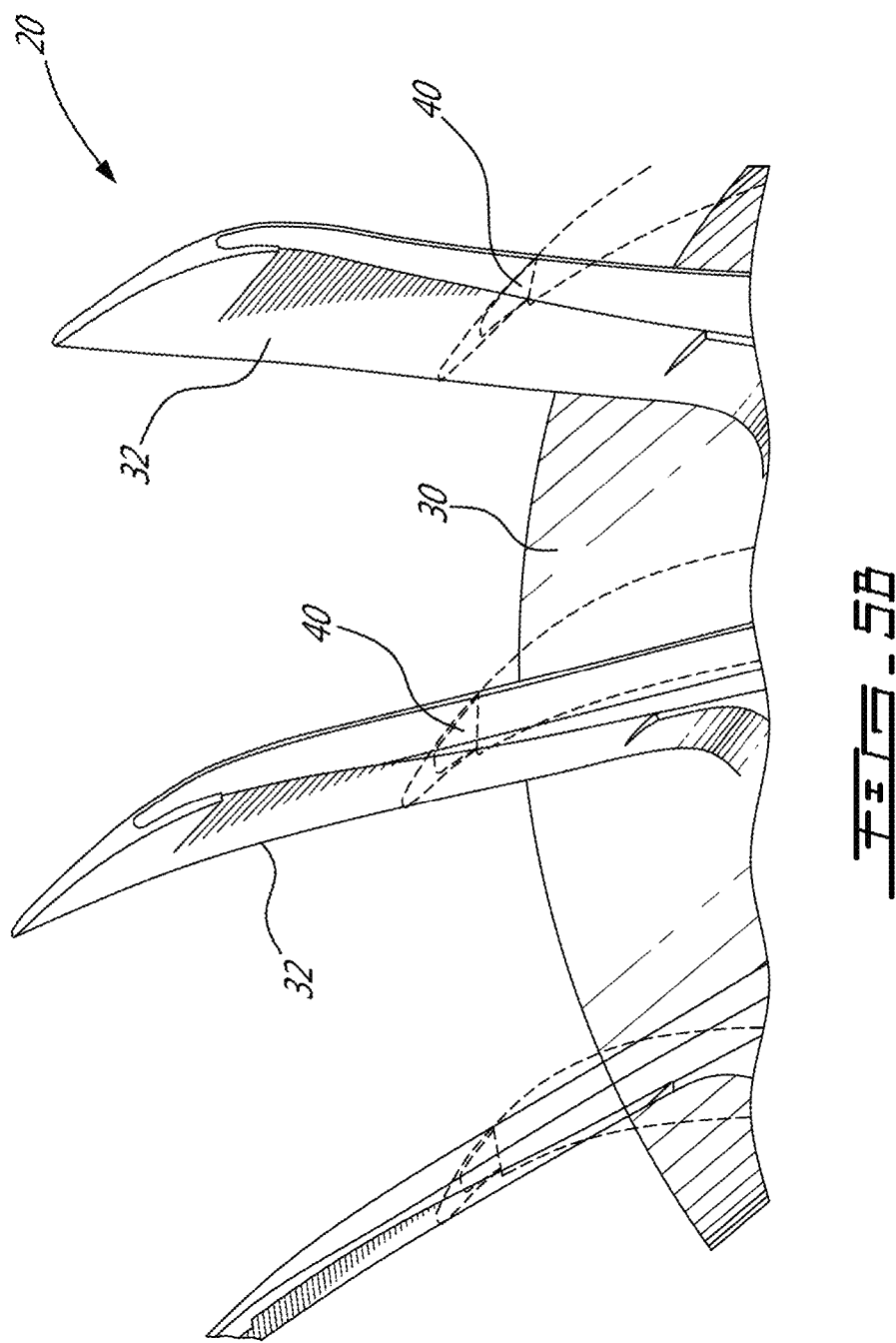

As best seen in FIG. 7A, the leading edge extensions 32 are least partially hollow, and have an internal cavity 40 formed therein. The internal cavity 40 is open at a rearward end when the leading edge assembly 20 is disassembled (i.e. detached from the fan 22), as can be seen in FIGS. 5A and 5B.

When the leading edge assembly 20 is mounted to the fan 22, as shown in FIGS. 2, 6 and 7, the internal cavities 40 of the leading edge extensions 32 are defined and formed between a radially inner portion 33 of the leading edge 23 of the fan blades 24 and the leading edge extensions 32, which project upstream away from the radially inner portion 33 of the leading edge 23 of the fan blades 24 to effectively form the leading edge of the fan blade 24 within the radially inner portion of fan assembly 12.

Accordingly, each of the leading edge extensions 32 has an internal cavity 40 therein, which extends radially away from the central core 30 of the leading edge assembly 20 and is at least partially, if not fully, defined within the leading edge extensions 32. As can be seen in the embodiment FIG. 7A, a majority of the cross-sectional perimeter of internal cavity 40 may be enclosed by the leading edge extension 32 itself (e.g. on three sides, in FIG. 7A), with the remaining cross-sectional perimeter of the cavity 40 is enclosed by the inner portion 33 of the leading edge 23 of the fan blades 24. In this manner, the internal cavity 40 is substantially enclosed and sealed about its cross-sectional perimeter, but for a gap 50 defined axially (i.e. in the page, in FIG. 7A) between a downstream edge 42 of the leading edge extension 32 and the opposing, and axially spaced apart, inner portion 33 of the fan blade leading edge 23. This gap 50 forms a radially extending slot 52 (see FIGS. 2 and 6) that is disposed near the radially inner end of the fan blades 24 and provides fluid flow communication between each the internal cavities 40 of the leading edge extensions 32 and at least a pressure side 28 of its respective fan blade 24.

During operation of the engine 10, the internal cavities 40 formed within the leading edge extensions 32 of the leading edge assembly 20 receive heated pressurized air from the, this heated pair is allowed to escape the internal cavities 40 via the slots 52, which generates a film of warm air that flows downstream from the slots 52 and over at least the pressure sides 28 of the fan blades 24. This warm film of air helps to reduce and/or prevent ice buildup on at least the radially inner portions of the fan blades 24. Thus, a stable warm boundary layer may be generated on at least the pressure surfaces 28 of the fan blades 24, at least near the radially inner blade roots 25, in order to keep the blade surfaces above the freezing point of water, thereby preventing (or at least limiting) the buildup of ice the fan blade surfaces. Because the cavities 40 are not formed in the airfoils of the fan blades 24 themselves (the fan blades 24 are, in at least one embodiment, substantially free of any airflow holes), but rather formed within the leading edge extensions 32 and defined between these leading edge extensions and the leading edges 23 of the fan blades 24, no additional holes or apertures for anti-icing purposes are required within the fan blades 24. This may avoid any unnecessary localized stresses in the fan blades and/or may avoid weakening the fan blades, reducing the thickness of the fan blades, or otherwise modifying the fan blades for anti-icing purposes.

Referring now particularly to FIG. 7A, the warm air within the internal air passage 40 within the leading edge extensions 32 of the detachable leading edge assembly 20 exits through the elongated and radially extending slot 52, which is defined by the axial gap 50 between the downstream edge 42 of the leading edge extension 32 and the opposing inner portion 33 of the fan blade leading edge 23. As seen in FIG. 7A, the gap 50 and slot 52 formed thereby extend through the pressure side wall 54 of the leading edge extension 32 in a direction substantially perpendicular to the pressure surface 28 of the fan blade 24. The slot 52 for each blade 24 may be disposed at a stream-wise location corresponding to maximum static pressure of the air flowing across the detachable leading edge extensions 32 and the fan blade 24 downstream thereof, which may occur at a point where the leading edge extensions 32 and the fan blade 24 meet due to a positive step configuration, as will now be described in more detail with reference to FIG. 7B.

As seen in greater detail in FIGS. 7A and 7B, the pressure side wall 54 of the leading edge extensions 32 has an upstream end 56 and a downstream end 58 terminating at the downstream edge 42, the axially extending gap 50 that forms the radial slot 52 being defined between the downstream edge 42 of the downstream end 58 and the opposing leading edge 33,23 of the fan blade 24. As can be seen in FIGS. 7 and 7B, the downstream end 58 of the pressure side wall 54 of the leading edge extension 32 is disposed further inwardly (e.g. in a tangential direction, which may lie in the page of the views of FIGS. 7 and 7B) than the upstream end 56, whereby as it extends downstream, the pressure side wall 54 bends inwardly toward an opposed suction side wall 55 of the leading edge extension 32 and projects into the internal air passage 40. This has the effect of positioning the downstream end 58 and its downstream edge 42 inwardly (e.g. tangentially) relative to the pressure surface 28 of the fan blade 24, and therefore relative to an edge 60 formed at the junction of the flattened inner portion 32 of the leading edge 23 and the pressure surface 28 of the fan blade 24. This accordingly forms a step, or offset X, as shown in FIG. 7B. The leading, pressure-side, edge 60, at the junction of the inner portion 33 of the leading edge 23 and the airfoil's pressure surface 28, forms a filet radius immediately downstream of the slot 52 between the leading edge extensions 32 and the fan blades 24. Stately differently, the slot 52 is located immediately upstream of the edge 60 is inset into the blade (e.g. in a tangential direction) relative to the filet radius formed by the edge 60, thereby defining the flow-wise offset X.

In operation, this offset X causes the warm air exiting the slots 52 between the leading edge extensions 32 and the fan blades 24 to exit the slots substantially perpendicularly relative to the main gas flow direction through the fan 12 before flowing over the filet radius edge 60, which is caused by a local decrease in static pressure, and then flowing downstream over the pressure surfaces 28 of the fan blades 24. The warm air existing the slots 52 in this manner may have the effect of warming the boundary layer distributed over the pressure surface 28 of the fan blade 28, to a downstream trailing edge 19 of the fan blades 24 (See FIG. 2). Accordingly, a warm boundary layer is thereby produced, which may help to insulate the blades from the cold air to which they may be exposed in operation.

The above-mentioned positive step (offset X) formed between inset slot 52 of the leading edge extensions 32 and the immediately downstream protruding filet radius edge 60 of the fan blades 24, accordingly provides a deliberate and controlled recess in the pressure side of the leading edge extensions 32, which may permit a local increase in local pressure on the pressure side of the fan blades 24, in proximity to their leading edge 23, and upstream of the slots 52. Accordingly, a depression is formed upstream of the slot 52, and a local stagnation point is induced by the depression in the aerodynamic surface upstream of the slot 52 (i.e. over the pressure side wall 54).

With reference to FIG. 7A, the schematic main flow streamlines M are therefore directed outwardly as the flow flows downstream over the protruding filet radius edge 60. This results in a locally reduced velocity, which in turn causes the local pressure increase at the stagnation point, which is depicted schematically by the static pressure distribution line SP.

When warm air from the internal cavity 40 exits via the slot 52 at a local stagnation point, a substantially uniform sheet of warm air is created that naturally accelerates in the negative pressure gradient downstream of the slot 52, which negative pressure gradient may keep the boundary layer substantially stable, and possibly laminar, for a majority of the blade chord (e.g. over 60% of the chord length) as it flows downstream to the trailing edge 19 of the fan blade 24. The warm air sheet may remain substantially stable far downstream the injection point, except possibly at the edges where the mixing process is similar to individual holes. This warm sheet of air may therefore help to keep most of the pressure surface 28 of the fan blades 24 above the water freezing point. This is particularly useful near the radially inner ends of the fan blades (i.e. between 0% and 50% span, from the inner roots 25 to the radially outer tips 27 of the fan blades 24), which region of the blades does not benefit as much from the high centrifugal loading forces to which the more radially outer portions of the blades (e.g. at the tips 27) and which can help with ice shedding.

Accordingly, the present fan assembly 12 having such a leading edge assembly 20 forms part of an anti-icing system for the turbofan engine 10, which helps to protect the fan from ice build-up during operation, without interfering with the high stress areas of the fan blades.

Referring now to FIGS. 8-11, a fan assembly 112 in accordance with another embodiment will now be described. The fan assembly 112 similarly includes a leading edge assembly 120 that is mounted to the fan 122 for rotation therewith. The leading edge assembly 120 of FIGS. 8-11 similarly includes a plurality of leading edge extensions 132, which are disposed upstream of the fan blades 124 near their leading edges 123.

Figure 9:
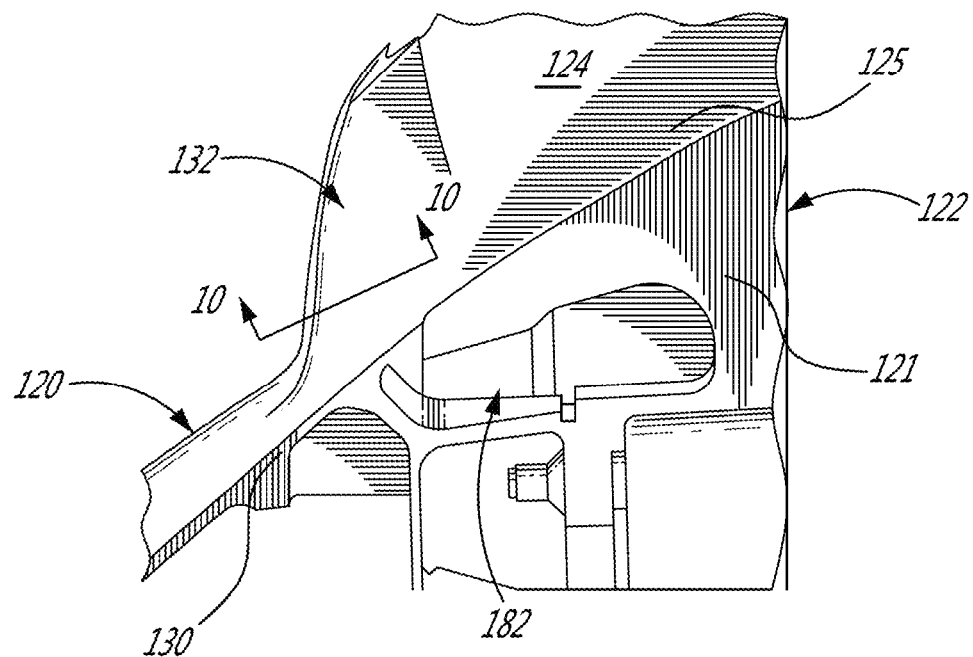
FIG. 9 is a radial cross-sectional view of the fan and the leading edge assembly of FIG. 8.

As seen in FIGS. 8 and 9, the leading edge extensions 132 are disposed near the roots 125 of the fan blades 124, and extend radially outward from an inner hub 130 that is mounted to a central hub 121 of the fan 122. The leading edge extensions 132 have a fin-like shape.

Figure 10:
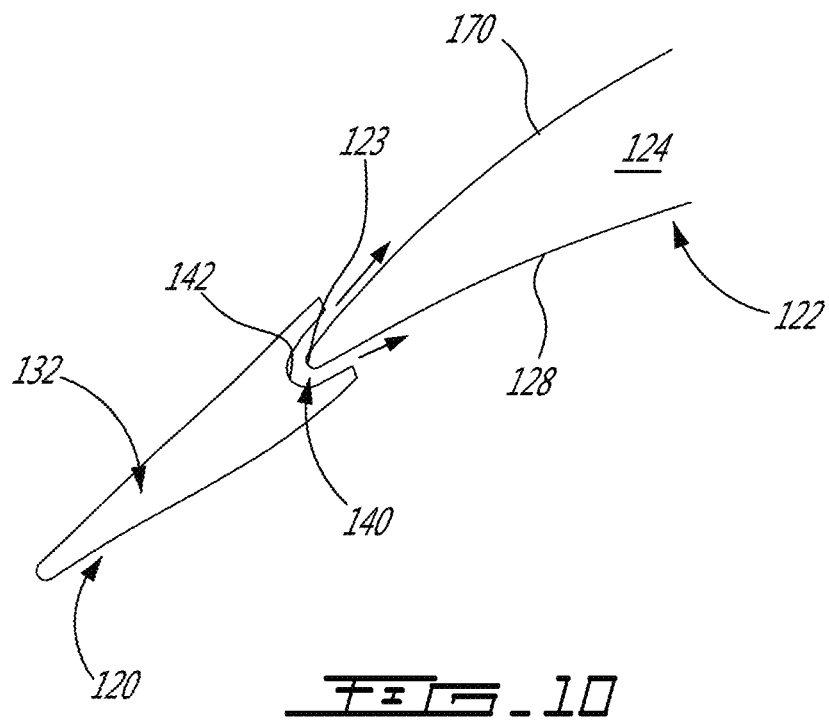
FIG. 10 is an axial cross-sectional view of the fan and the leading edge assembly of FIG. 8, taken through line 10-10 in FIG. 9.

A radially extending cavity 140 is also defined between the leading edges 123 of the fan blades 124 and the leading edge extensions 132 upstream therefrom. However, in this embodiment the cavities 140 are not internal or enclosed, but rather form channels which are defined by an axial gap between the spaced apart leading edges 123 and a downstream (or trailing edge) surface 142 of the leading edge extensions 132. See FIG. 10, for example. In this embodiment, therefore, a radially extending gap, including the cavities 140, is defined between the leading edge extensions 132 and the both the pressure surface 128 and the opposite suction surface 170 of the fan blades 124. As seen in FIG. 10, the downstream or trailing edge surface 142 of the leading edge extensions 132 may have a size and shape complementary to that of the leading edges 123 of the fan blades, such as to create a substantially equal gap between the downstream surface 142 and the fan blades 124 about the entire leading edge region. Thus, the leading edge extensions 132 surround, but do not directly abut or touch, the leading edges 123 of the fan blades 124, leaving horseshoe or crescent shaped cavities 140 (when viewed in an axial cross-sectional view as shown in FIG. 10) therebetween. The leading edge extensions 132 therefore form a sort of "chap" or protective shield that extends over the leading edges 123 of the blades 124, but is axially spaced apart therefrom to define the cavities 140 therebetween.

Much as per the embodiment of FIGS. 1-7B, warm compressed air is fed into these cavities 140, from which the warm air then flows downstream over both the pressure surfaces 128 and the suction surfaces 170 of the fan blades 124.

Figure 11:
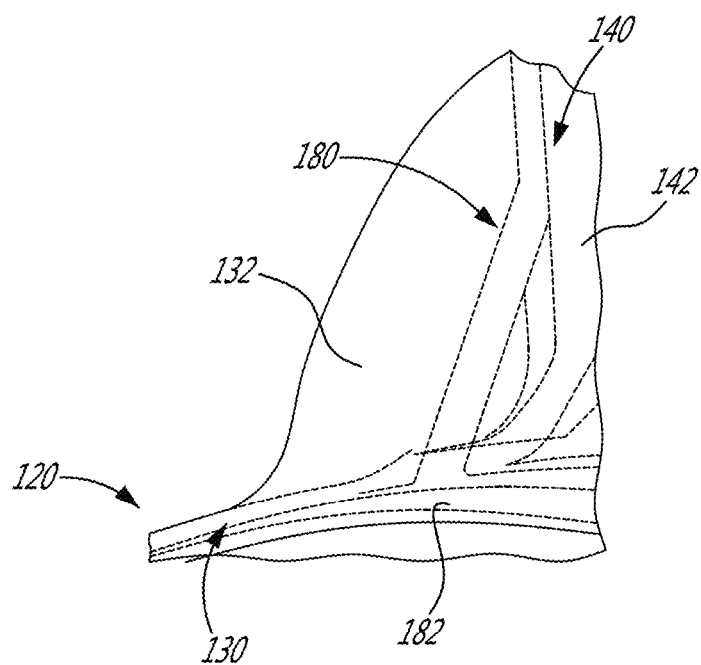
FIG. 11 is a partially transparent perspective view of the leading edge assembly of FIGS. 8-10, showing an internal passage therein.

As seen in FIG. 11, this warm air is fed into each of the cavities 140 via an internal passage 180 formed within each of the leading edge extensions 132. The angled internal passage 180 fluidly interconnects an internal hub cavity 182, formed within the central hub 130 of the leading edge assembly 120, and the radially extending cavities 140 at the downstream ends 142 of the protecting leading edge extensions 132. The internal passage 180 for the hot air is accordingly imbedded into the "fin" of the leading edge extension 132, and disposed at an angle such as to deliver the warm air to a point radially outward on the fin, thereby ensuring that the warm air is discharged to the radially outer half of the fin 132, and thus of the cavity 140.

In the embodiment of FIGS. 8-11, therefore, the leading edge extensions 132 of the leading edge assembly 120 are positioned in front of the root 125 of each fan blade 124, and is supported on the separate fan spinner (or hub 130 of the leading edge assembly 120). The gap 140 separating the trailing edge surface 142, which is concave, of the leading edge extensions 132 from the leading edge 123 of the fan blade 124, may be tight (i.e. axially narrower) at the bottom (i.e. radially inward, at the hub and leading edge extension interface) and opens up (i.e. becomes axially larger) as the gap 140 extends radially along the blade length from the radially inner end outward.

The cavity 140 of each leading edge extension 132 is supplied with warm air from the internal hub cavity 182, via the angled internal passage 180. The warm air is discharged through the gap 140 formed between the leading edge extensions 132 and one or both of the pressure and suction surfaces of the blades 124, as a warm boundary layer, tangential to the blade surface. The external surface geometry of the leading edge extensions 132 ensures a progressive flow acceleration over the leading edge extensions 132 in an axial direction, which stabilizes the boundary layer as the warm air exits the leading edge extensions 132 and flows downstream to the surfaces of the fan blades 124. The warm air may be supplied in several ways. First, it may progress inside the internal passage(s) 180 of the leading edge extensions 132 and is discharged in the top half of the trailing edge cavity 140 thereby ensuring that the warm air is discharged as far as possible from the blade hub. The second warming air path directly discharges warm air at the lower half of the surfaces of the fan blades 124. The resulting warm fan blade surfaces preclude or at least reduce ice accretion at a critical radius and split the icing region in two. The splitting of the icing region in two (or more) regions may provide uniform and random ice shedding in smaller pieces.

Although the above description relates to a specific preferred embodiment as presently contemplated by the inventors, it will be understood that the invention in its broad aspect includes mechanical and functional equivalents of the elements described herein. For example, while the gas turbine engine 10 may be of the type suitable for airborne aircraft applications, it will be understood that aspects of the disclosure are also applicable to any type of turbomachine or engine with a fan or other upstream compressor rotor with anti-icing requirements, and a source of relatively hot air (e.g., from a compressor). For example, an industrial gas turbine engine operating in a cold environment (e.g. electrical generation in cold temperatures) may also be provided with the aspects of the present disclosure in order to prevent unwanted ice formation and/or buildup on the aforementioned compressor rotor, fan, etc.

The invention claimed is:

1. A fan assembly for a gas turbine engine having a longitudinal center axis and defining a primary airflow path therethrough, the fan assembly comprising:
a fan rotatable about the longitudinal center axis, the fan having a central hub and a plurality of fan blades projecting from the central hub, the fan blades having blade leading edges and extending a full span length from a radially inner root to a radially outer tip; and
a leading edge assembly mounted to the fan for rotation therewith, the leading edge assembly having a central core attached to the central hub of the fan and a plurality of leading edge extensions projecting from the central core and circumferentially spaced apart to align with the blade leading edges of the fan blades, the leading edge extensions extending radially away from the central core a distance less than the full span length of the fan blades, the leading edge extensions mounted to the fan blades to define internal cavities between the blade leading edges of the fan blades and the leading edge extensions, the internal cavities extending radially away from central core at least partially within the leading edge extensions, the internal cavities receiving heated pressurized air from the gas turbine engine in operation, and slots that are elongated and extending radially along a downstream edge of the leading edge extensions, the slots defined axially between the downstream edge and the blade leading edges of the fan blades to provide fluid flow communication between the internal cavities and at least pressure surfaces of the fan blades.

2. The fan assembly according to claim 1, wherein the downstream edge of the leading edge extensions is disposed inward relative to the pressure surfaces of the fan blades at the blade leading edges to form a step immediately downstream of the slots.

3. The fan assembly according to claim 1, wherein radially inner portions of the leading edges of the fan blades are blunt, and an edge formed at a junction of the blunt radially inner portions of the leading edges and the pressure surfaces of the fan blades forms a filet radius.

4. The fan assembly according to claim 3, wherein the filet radius edge protrudes into a main boundary layer flow on a pressure side wall of the leading edge extensions to form a step.

5. The fan assembly according to claim 4, wherein the slots are located at the step, immediately upstream of the filet radius edge.

6. The fan assembly according to claim 1, wherein the slots extend through a pressure side wall of the leading edge extensions in a direction substantially perpendicular to the pressure surfaces of the fan blades.

7. The fan assembly according to claim 1, wherein a distance that the leading edge extensions extend radially away from the central core is between 0% and 50% of the full span length of the fan blades.

8. The fan assembly according to claim 1, wherein the leading edge assembly is detachably mounted to the fan and configured for removal therefrom without sacrificing either the fan or the leading edge assembly.

9. The fan assembly according to claim 1, wherein the internal cavities are substantially enclosed and sealed about their cross-sectional perimeter but for the slots defined axially between the downstream edge on a pressure side of the leading edge extensions and the blade leading edges of the fan blades.

10. The fan assembly according to claim 1, wherein the fan blades are free of any airflow holes.

11. The fan assembly according to claim 1, wherein the slots are disposed on both a pressure side and a suction side of the leading edges extensions, to thereby provide fluid flow communication between the internal cavities and both the pressure surfaces and suction surfaces of the fan blades downstream of the leading edge extensions.

12. The fan assembly according to claim 11, wherein the internal cavities have a crescent cross-sectional shape, a downstream surface of the leading edge extensions facing the leading edges of the fan blades being concave.

13. The fan assembly according to claim 1, wherein the slots are disposed at a stream-wise location corresponding to a maximum static pressure of the air flowing across the leading edge extensions and the at least pressure surfaces of the fan blades downstream thereof.

14. A gas turbine engine comprising a fan mounted on a shaft for rotation about a longitudinal center axis, the fan including a hub supporting a plurality of fan blades, and a leading edge blade assembly mounted to the fan for rotation therewith about the longitudinal center axis, the leading edge assembly having a central core attached to the hub of the fan and a plurality of leading edge extensions radially projecting from the central core and circumferentially spaced apart to align with the fan blades, the leading edge extensions mounted to and extending upstream from blade leading edges of the fan blades, air cavities defined between the blade leading edges of the fan blades and the leading edge extensions, the air cavities extending radially away from the longitudinal center axis near the central core and at least partially enclosed by the leading edge extensions, the air cavities receiving heated pressurized air from an engine cavity of the gas turbine engine during operation, and gaps defined axially between downstream edges of the leading edge extensions and the leading edges of the fan blades on at least a pressure side of the fan blades to provide fluid flow communication between the internal air cavities and a pressure side of the fan blades.

15. The gas turbine engine according to claim 14, wherein the leading edge extensions extend radially away from the central core a distance less than a full span length of the fan blades.

16. The gas turbine engine according to claim 15, wherein a distance that the leading edge extensions extend radially away from the central core is between 0% and 50% of the full span length of the fan blades.

17. The gas turbine engine according to claim 14, wherein the gaps extend a radially distance to define elongated slots.

18. The gas turbine engine according to claim 17, wherein the downstream edges of the leading edge extensions are disposed inward relative to the pressure surfaces of the fan blades at the blade leading edges to form a step immediately downstream of the elongated slots.

19. The gas turbine engine according to claim 18, wherein an edge formed at a junction of the leading edges and the pressure surfaces of the fan blades forms a filet radius.

20. A method of impeding icing on a fan blades of a fan in a gas turbine engine, the method comprising:
receiving heated pressurized air within cavities defined between leading edges of the fan blades and leading edge extensions of a leading edge assembly mounted to the fan for rotation therewith, the leading edge extensions being disposed upstream of the leading edges of the fan blades;
allowing the heated pressurized air to exit the cavity through slots located at least on a pressure side of the fan blades, the slots extending radially within an inner span half of the fan blades and the slots defined axially between downstream edges of the leading edge extensions and the blade leading edges of the fan blades downstream therefrom; and
directing the heated pressurized air exiting via the slots radially outwardly to form a film of the heated pressurized air flowing in a downstream direction over at least the pressure surfaces of the fan blades.

* * * * *